(12) United States Patent
Laemmle

(10) Patent No.: US 11,552,502 B2
(45) Date of Patent: Jan. 10, 2023

(54) INDUCTION CHARGING DEVICE

(71) Applicant: MAHLE International GmbH, Stuttgart (DE)

(72) Inventor: Christopher Laemmle, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 17/014,669

(22) Filed: Sep. 8, 2020

(65) Prior Publication Data

US 2020/0403448 A1     Dec. 24, 2020

Related U.S. Application Data

(63) Continuation of application No. PCT/EP2019/055789, filed on Mar. 7, 2019.

(30) Foreign Application Priority Data

Mar. 8, 2018 (DE) .................... 10 2018 203 557.1

(51) Int. Cl.
    *H02J 50/10*            (2016.01)
    *H02J 50/70*            (2016.01)
    (Continued)

(52) U.S. Cl.
    CPC ............ *H02J 50/10* (2016.02); *B60L 53/302* (2019.02); *H02J 50/70* (2016.02); *B60L 53/12* (2019.02); *H02J 7/0042* (2013.01)

(58) Field of Classification Search
    CPC .......... H02J 50/10; H02J 50/70; B60L 53/302
    (Continued)

(56) References Cited

U.S. PATENT DOCUMENTS 9,662,992 B2    5/2017   Doepke
9,862,282 B2    1/2018   Böser et al.
(Continued)

FOREIGN PATENT DOCUMENTS

DE     102005012501 A1    9/2006
DE     102011088112 A1    6/2013
(Continued)

OTHER PUBLICATIONS

International Preliminary Report on Patentability of the European Patent Office in PCT/EP2019/055789 (from which this application claims priority) dated Sep. 17, 2020.
(Continued)

*Primary Examiner* — Suchin Parihar
(74) *Attorney, Agent, or Firm* — Falk Ewers; Ewers IP Law PLLC

(57) ABSTRACT

An induction charging device for an electrically operated motor vehicle includes a charging assembly having a charging coil, and a temperature-control assembly having a fluid pipe. The charging coil can be inductively coupled to a primary coil, such that a battery in the motor vehicle can be inductively charged. The charging assembly has a ferrite plate for directing the electromagnetic alternating field, which is established between the charging coil and the fluid pipe, such that waste heat from the ferrite plate and the charging coil can be transmitted to the fluid in the fluid pipe. The fluid pipe is formed by a shell-type metal shielding plate for shielding electromagnetic field emissions and a shell-type lower shell heat-conductingly in contact with the ferrite plate. The metal shielding plate and the lower shell are secured on one another in a fluid-tight manner and spaced apart from one another with a stiffening insert.

10 Claims, 1 Drawing Sheet

(51) Int. Cl.
　　　*B60L 53/302*　　　(2019.01)
　　　*B60L 53/12*　　　　(2019.01)
　　　*H02J 7/00*　　　　　(2006.01)

(58) Field of Classification Search
　　　USPC ........................................................ 320/108
　　　See application file for complete search history.

(56) References Cited

U.S. PATENT DOCUMENTS

| | | | |
|---|---|---|---|
| 10,464,430 | B2 | 11/2019 | Kume et al. |
| 10,650,952 | B2 | 5/2020 | Laemmle et al. |
| 10,756,572 | B2 | 8/2020 | Ansari et al. |
| 2006/0291165 | A1 | 12/2006 | Flesch et al. |
| 2013/0154553 | A1* | 6/2013 | Steele .................... B60M 7/003<br>320/108 |
| 2016/0347188 | A1* | 12/2016 | Nakahara ................ H02J 50/10 |
| 2017/0253129 | A1* | 9/2017 | Garcia ................ H01F 27/2876 |
| 2017/0338023 | A1 | 11/2017 | Ansari et al. |
| 2018/0141451 | A1* | 5/2018 | Totsuka .............. H01F 27/2871 |
| 2018/0254136 | A1* | 9/2018 | Ueda ........................ H01F 27/10 |
| 2020/0398687 | A1* | 12/2020 | Laemmle ................ H02J 50/10 |
| 2021/0151238 | A1* | 5/2021 | Kim ....................... H01F 27/025 |
| 2021/0195811 | A1* | 6/2021 | Wiebelt .................. H02J 50/80 |

FOREIGN PATENT DOCUMENTS

| | | |
|---|---|---|
| DE | 102013010695 A1 | 8/2014 |
| DE | 102017200465 A1 | 11/2017 |
| DE | 102017210740 A1 | 12/2017 |
| DE | 102017202067 A1 | 8/2018 |
| EP | 1175135 A1 | 1/2002 |
| EP | 1729557 A2 | 12/2006 |
| EP | 2808976 A1 | 12/2014 |
| WO | 2013142064 A1 | 9/2013 |

OTHER PUBLICATIONS

International Search Report dated Jun. 25, 2019 of international application PCT/EP2019/055789 on which this application is based.

* cited by examiner

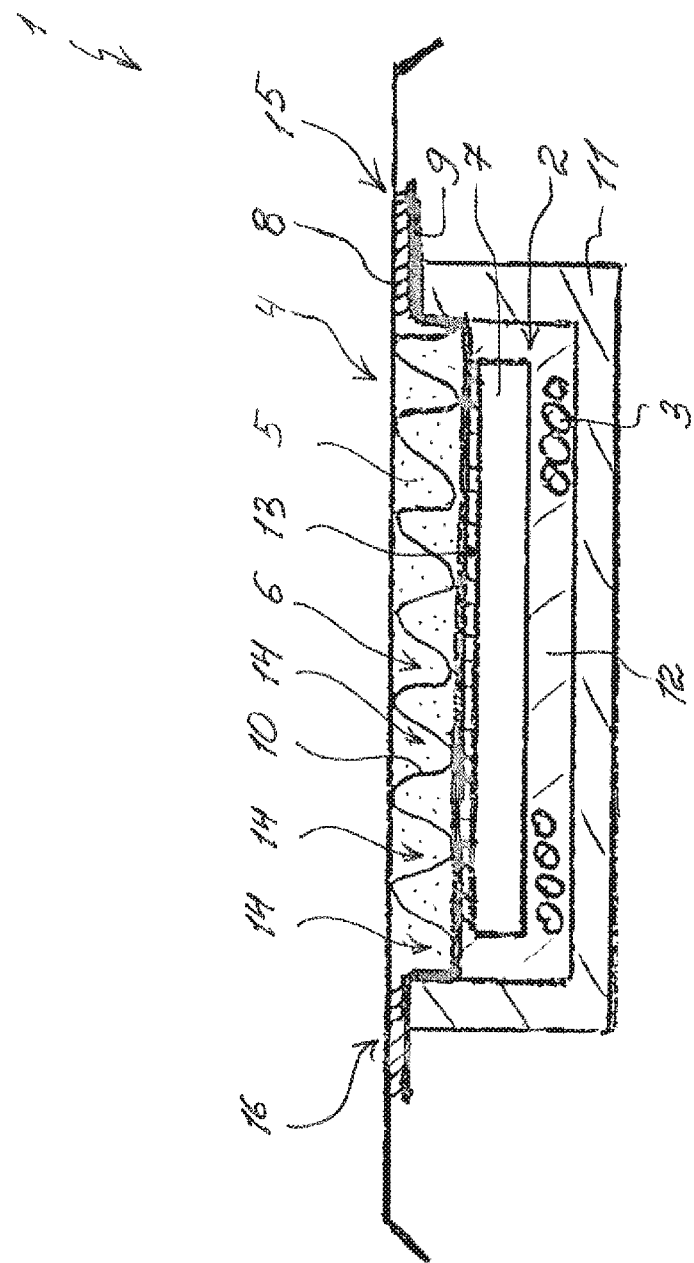

INDUCTION CHARGING DEVICE

CROSS REFERENCE TO RELATED APPLICATIONS

This application is a continuation application of international patent application PCT/EP2019/055789, filed Mar. 7, 2019, designating the United States and claiming priority to German application 10 2018 203 557.1, filed Mar. 8, 2018, and the entire content of both applications is incorporated herein by reference.

TECHNICAL FIELD

The disclosure relates to an induction charging device for a partially or fully electrically operated motor vehicle.

BACKGROUND

Induction charging devices are already known from the related art and are used for the contact-free charging of a battery in a motor vehicle. An external primary coil is thereby inductively coupled to a secondary coil in the motor vehicle. An alternating current, which generates an electromagnetic alternating field around the primary coil, flows through the primary coil. In the secondary coil, the electromagnetic alternating field induces an alternating current, which is rectified with the power electronics and is supplied to the battery.

To reduce the charging losses in the induction charging device, the electromagnetic alternating field around the secondary coil is influenced by a magnetic ferrite plate. However, electromagnetic field emissions, the height of which increases with the charging power, are nonetheless created in the induction charging device. The field emissions can be reduced with a metal plate or with a shielding plate, respectively, mostly made of aluminum, in order to protect electronic equipment in the motor vehicle and to rule out a negative health effect on a human. An induction charging device of this type is described, for example, in WO 2013/142064 A1.

During a charging process, a waste heat which is usually dissipated to a fluid in a cooling device, is generated in the ferrite plate, in the metal plate, or in the shielding plate, respectively, and in the charging coil. The waste heat can be used for heating purposes in the motor vehicle, as it is described, for example, in DE 10 2011 088 112 A1, for preheating a lubricant. The metal plate and the ferrite plate can furthermore negatively influence one another and the charging power of the induction charging device during a charging process.

SUMMARY

It is thus an object of the disclosure to provide an improved or at least alternative embodiment for an induction charging device of the generic type, in the case of which the described disadvantages are overcome.

This object is achieved by an induction charging device for a partially or fully electrically operated motor vehicle as described herein.

A generic induction charging device for a partially or fully electrically operated motor vehicle has at least one charging assembly including a charging coil and a temperature-control assembly including a fluid pipe, through which a fluid can flow. The charging coil of the charging assembly can be inductively coupled to a primary coil, such that a battery can be inductively charged in the motor vehicle. The charging assembly further has a ferrite plate, which is secured between the charging coil and the fluid pipe, for directing the electromagnetic alternating field. The fluid pipe of the temperature-control assembly is heat-conductingly secured to the ferrite plate on the vehicle side, such that the waste heat from the ferrite plate and from the charging coil can be transmitted to the fluid in the fluid pipe of the temperature-control assembly. According to an aspect of the disclosure, the fluid pipe of the temperature-control assembly is formed by a metal shielding plate for shielding electromagnetic field emissions, and a shell-type lower shell, which is heat-conductingly in contact with the ferrite plate. The metal shielding plate and the lower shell are thereby secured to one another in a fluid-tight manner and are secured spaced apart from one another with a separate stiffening insert.

In this context, the term "on the vehicle side" means that in an installed state of the induction charging device, the fluid pipe is arranged between the motor vehicle and the ferrite plate. The stiffening insert secures the metal shielding plate and the lower shell of the temperature-control assembly spaced apart from one another. The stiffness and the pressure resistance of the temperature-control assembly can further be increased with the stiffening insert. The stiffening insert can advantageously secure the lower shell of the fluid pipe and the metal shielding plate at a defined distance from one another. The ferrite plate thereby heat-conductingly contacts the lower shell of the temperature-control assembly, such that a distance between the metal shielding plate and the ferrite plate is also defined with the stiffening insert. The distance can thereby be measured in such a way that a negative effect of the metal shielding plate and of the ferrite plate on one another can be reduced, and a sufficient shielding effect can nonetheless be created with the metal shielding plate. A negative effect of eddy currents generated in the metal shielding plate on the electromagnetic alternating field directed with the ferrite plate can thus in particular be reduced.

In the case of a particularly advantageous design of the induction charging device according to an aspect of the disclosure, it is provided that the separate stiffening insert is in contact with the lower shell on one side and with the metal shielding plate on the other side. The separate stiffening insert then secures the lower shell and the metal shielding plate at a defined distance from one another. The defined distance between the lower shell and the metal shielding plate is thereby determined by the thickness of the separate stiffening insert. The metal shielding plate and the ferrite plate are further also secured at a defined distance from one another. The shielding effect of the metal shielding plate is attained with the eddy currents generated in said metal shielding plate. However, the eddy currents cause losses in the induction charging device and optionally an unwanted heating of the metal shielding plate. The distance between the metal shielding plate and the ferrite plate thus influences the energy transmission between the charging coil and the primary coil. Due to the defined distance between the metal shielding plate and the ferrite plate, the intensity of the electromagnetic alternating field at the metal shielding plate and thus also losses in the metal shielding plate can be influenced. The energy transmission between the charging coil and the primary coil can thus also be optimized.

Advantageously, it can additionally be provided that a thickness of the separate stiffening insert is adapted to the required defined distance between the lower shell and the metal shielding plate. The lower shell and the metal shielding plate are thereby designed independently of the required defined distance between the lower shell and the metal shielding plate. Advantageously, it can be provided that the fluid pipe of the temperature-control assembly is set up in a modular manner, wherein the lower shell and the metal shielding plate are designed independently of the required defined distance, and wherein the stiffening insert is designed dependently on the required defined distance.

The energy transmission between the charging coil and the primary coil can in particular be optimized with the defined distance. The energy transmission thereby changes as a function of the charging power of the induction charging device, which, in turn, is designed as a function of the motor vehicle. Due to the above-described advantageous design of the fluid pipe, the latter can be produced to meet the requirements, in that the distance between the lower shell and the metal shielding plate is varied with the separate stiffening insert. The lower shell and the metal shielding plate thereby remain of the same design, independently of the required defined distance, so that the production is significantly simplified, and the variety of the possible flat pipes is increased. The gap between the metal shielding plate and the lower shell, which may be created by the variable thickness of the stiffening insert, can be compensated, for example, when joining the metal shielding plate to the lower shell. In summary, a higher efficiency of the induction charging device can be attained, and the function of the induction charging device can be ensured.

Advantageously, it can be provided that the stiffening insert forms several turbulence ducts in the fluid pipe of the temperature-control assembly. The fluid can be swirled better in the fluid pipe of the temperature-control assembly with the turbulence ducts, and the charging assembly can thus be cooled better. The stiffening insert can be formed from metal, for example, typically from aluminum. So as not to influence the electromagnetic alternating field and the charging assembly, the stiffening insert can alternatively be formed from an electrical insulator, typically from plastic. In the alternative or in addition, the lower shell can also be formed from an electrical insulator, typically from plastic. The lower shell is advantageously diffusion-tight and can have, for example, a sealing coating for this purpose. The metal shielding plate can advantageously be formed from a conductive material, typically from metal, such as, for example, copper or aluminum. The thickness of the metal shielding plate is thereby selected in such a way that a sufficient shielding effect is attained with the metal shielding plate.

To heat-conductingly secure the ferrite plate to the lower shell of the temperature-control assembly, the ferrite plate of the charging assembly can be adhered, cast, pressed, or screwed to the lower shell of the fluid duct. A heat-conducting layer, typically a heat-conducting casting compound, a heat-conducting paste, or a heat-conducting insert, can advantageously be arranged between the lower shell and the ferrite plate. The thermal contact resistance can be reduced with the heat-conducting layer, and the waste heat generated in the ferrite plate can be better dissipated to the fluid in the fluid pipe.

To secure the metal shielding plate and the lower shell to one another in a fluid-tight manner, the metal shielding plate can be adhered, welded, clamped, or screwed to the lower shell. The fluid can advantageously be capable of flowing through the fluid pipe of the temperature-control assembly from a fluid inlet to a fluid outlet, and the temperature control assembly can be capable of being fluidically connected to a vehicle cooling system via the fluid inlet and via the fluid outlet of the fluid pipe.

In summary, the metal shielding plate and the ferrite plate is safely secured to one another at a defined distance in the induction charging device according to the disclosure, such that a negative effect of the metal shielding plate and of the ferrite plate on one another can be reduced, and a sufficient shielding effect can nonetheless be created with the metal shielding plate.

Further important features and advantages of the disclosure follow from the drawing, and from the corresponding FIGURE description on the basis of the drawing.

It goes without saying that the above-mentioned features and the features, which will be described below, cannot only be used in the respective specified combination, but also in other combinations or alone, without leaving the scope of the present disclosure.

BRIEF DESCRIPTION OF THE DRAWINGS

The disclosure will now be described with reference to the drawings wherein:

FIG. 1 shows a sectional view of an induction charging device according to an exemplary embodiment of the disclosure.

DESCRIPTION OF EXEMPLARY EMBODIMENTS

The sole FIG. 1 shows a sectional view of an induction charging device 1 according to an exemplary embodiment of the disclosure for a partially or fully electrically operated motor vehicle. The induction charging device 1 has a charging assembly 2 including a charging coil 3, which can be inductively coupled to a primary coil, which is not shown here. The induction charging device 1 further has a temperature-control assembly 4 including a fluid pipe 6, through which a fluid 5 can flow. The charging assembly 2 moreover has a ferrite plate 7, which is heat-conductingly secured thereto between the charging coil 3 and the fluid pipe 6, for directing the electromagnetic alternating field.

The fluid pipe 6 is thereby formed with a metal shielding plate 8 for shielding electromagnetic field emissions, and a shell-shaped lower shell 9, which is in heat-conducting contact with the ferrite plate 7. The metal shielding plate 8 and the lower shell 9 are secured to one another in a fluid-tight manner and spaced apart from one another with a stiffening insert 10. To secure the metal shielding plate 8 and the lower shell 9 to one another in a fluid-tight manner, the metal shielding plate 8 can be adhered, welded, clamped, or screwed to the lower shell 9.

The fluid pipe 6 of the temperature-control assembly 4 is heat-conductingly secured to the ferrite plate 7 on the vehicle side, such that the waste heat from the ferrite plate 7 and from the charging coil 3 can be transmitted to the fluid 5 in the fluid pipe 6 of the temperature-control assembly 4. In the installed state of the induction charging device 1, the fluid pipe 6, which is arranged at the temperature-control assembly 4 on the vehicle side, is thus arranged between the motor vehicle and the ferrite plate 7. The charging coil 3, the ferrite plate 7, and the lower shell 9 of the temperature-control assembly 4 are arranged in a housing 11 of the induction charging device 1 and are cast to one another with a casting compound 12. A heat-conducting layer 13, which reduces the thermal contract resistance, is moreover arranged between the lower shell 9 and the ferrite plate 7.

The waste heat generated in the ferrite plate 7 can thus be better dissipated to the fluid 5 in the fluid pipe 6.

The stiffening insert 10 secures the metal shielding plate 8 and the lower shell 9 of the temperature-control assembly 4 at a distance from one another and moreover defines a distance between the metal shielding plate 8 and the ferrite plate 7. The distance is thereby selected such that a negative effect of the metal shielding plate 8 and of the ferrite plate 7 on one another can be reduced, and a sufficient shielding effect can nonetheless be created with the metal shielding plate 8. The stiffening insert 10 further increases the stiffness and the pressure resistance of the fluid duct 6 of the temperature-control assembly 4. In the fluid pipe 6, the stiffening insert 10 forms several turbulence ducts 14, which supports a dissipation of the waste heat from the charging assembly 2 and in particular from the ferrite plate 7.

So as not to influence the electromagnetic alternating field around the charging assembly 2, the stiffening insert 10 and the lower shell 10 of the fluid pipe 6 can be formed from an electrical insulator, typically from plastic. The metal shielding plate 8 can advantageously be formed from a conductive material, typically from metal, such as aluminum or copper.

The fluid 5 can flow through the fluid pipe 6 of the temperature-control assembly 4 from a fluid inlet 15 to a fluid outlet 16, and the temperature control assembly 4 can be fluidically coupled to a vehicle cooling system, which is not shown here, via the fluid inlet 15 and via the fluid outlet 16.

In summary, the metal shielding plate 8 and the ferrite plate 7 is safely secured to one another at a defined distance in the induction charging device 1 according to an exemplary embodiment of the disclosure, such that a negative effect of the metal shielding plate 8 and of the ferrite plate 7 on one another can be reduced, and a sufficient shielding effect can nonetheless be created with the metal shielding plate 8. The waste heat generated in the ferrite plate 7 and in the metal shielding plate 8 can further be transported away effectively through the fluid pipe 7.

It is understood that the foregoing description is that of the exemplary embodiments of the disclosure and that various changes and modifications may be made thereto without departing from the spirit and scope of the disclosure as defined in the appended claims.

What is claimed is:

1. An induction charging device for a partially or fully electrically operated motor vehicle, the induction charging device comprising:
   a temperature-control assembly comprising a fluid pipe, through which a fluid can flow; and
   at least one charging assembly comprising a charging coil and a ferrite plate arranged between the charging coil and the temperature-control assembly,
   wherein the charging coil of the charging assembly can be inductively coupled to a primary coil, such that a battery can be inductively charged in the motor vehicle,
   wherein the charging assembly has a ferrite plate, which is secured between the charging coil and the fluid pipe, for directing the electromagnetic alternating field,
   wherein, in an installed state of the induction charging device, the fluid pipe of the temperature-control assembly is heat-conductingly secured to the ferrite plate on the vehicle side, such that the waste heat from the ferrite plate and from the charging coil can be transmitted to the fluid in the fluid pipe of the temperature-control assembly,
   wherein the fluid pipe of the temperature-control assembly is formed by a metal shielding plate for shielding electromagnetic field emissions, and a shell-type lower shell, which is heat-conductingly in contact with the ferrite plate,
   wherein the metal shielding plate and the lower shell are secured to one another in a fluid-tight manner and spaced apart from one another with a separate stiffening insert arranged between the metal shielding plate and the lower shell such that:
   the stiffening insert is in contact with the lower shell on one side and with the metal shielding plate on the other side, and
   the stiffening insert secures the lower shell and the metal shielding plate and thus the metal shielding plate and the ferrite plate at a defined distance from one another,
   wherein the stiffening insert has a first surface and a second surface,
   wherein the fluid flows around both the first and second surfaces,
   wherein the fluid pipe of the temperature-control assembly is set up in a modular manner,
   wherein the lower shell and the metal shielding plate are designed independently of the required defined distance,
   wherein the stiffening insert is designed dependently on the required defined distance, and
   wherein a gap between the metal shielding plate and the lower shell resulting from the adapted thickness of the stiffening insert, is compensated when joining the metal shielding plate to the lower shell.

2. The induction charging device according to claim 1, wherein the stiffening insert forms several turbulence ducts in the fluid pipe of the temperature-control assembly.

3. The induction charging device according to claim 1, wherein the stiffening insert is formed from an electrical insulator, typically from plastic.

4. The induction charging device according to claim 1, wherein the lower shell is formed from an electrical insulator, typically from plastic.

5. The induction charging device according to claim 1, wherein the metal shielding plate is formed from a conductive material, typically from metal.

6. The induction charging device according to claim 1, wherein the ferrite plate of the charging assembly is adhered, cast, pressed, or screwed to the lower shell of the fluid duct.

7. The induction charging device according to claim 1, wherein a heat-conducting layer, typically a heat-conducting casting compound, a heat-conducting paste, or a heat-conducting insert, is arranged between the lower shell and the ferrite plate.

8. The induction charging device according to claim 1, wherein the metal shield plate is adhered, welded, clamped, or screwed to the lower shell.

9. The induction charging device according to claim 1, wherein the fluid can flow through the fluid pipe of the temperature-control assembly from a fluid inlet to a fluid outlet, and
   wherein the temperature control assembly can be fluidically connected to a vehicle cooling system via the fluid inlet and via the fluid outlet of the fluid pipe.

10. The induction charging device according to claim 1, wherein the stiffening insert is formed from metal, typically from aluminum.

* * * * *